Aug. 4, 1931.　　　F. J. HEALEY　　　1,817,819
VARIABLE VELOCITY RATIO GEARING
Filed April 7, 1930　　　5 Sheets-Sheet 2

F. J. Healey
INVENTOR

By: Marks & Clerk
Attys.

Aug. 4, 1931.  F. J. HEALEY  1,817,819
VARIABLE VELOCITY RATIO GEARING
Filed April 7, 1930  5 Sheets-Sheet 3

F. J. Healey
INVENTOR

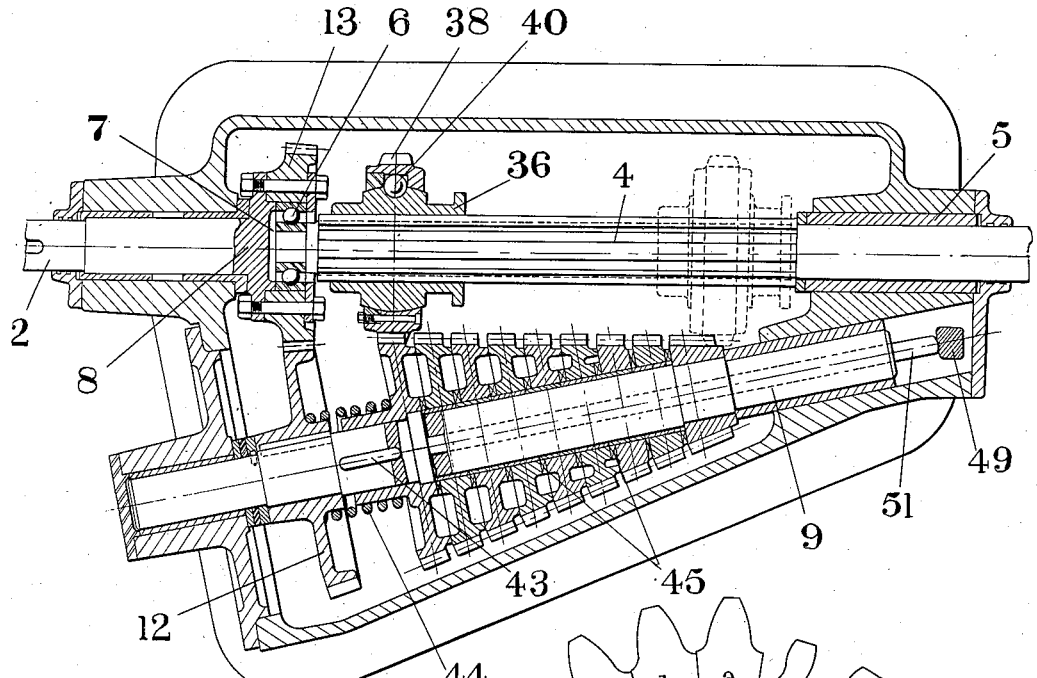
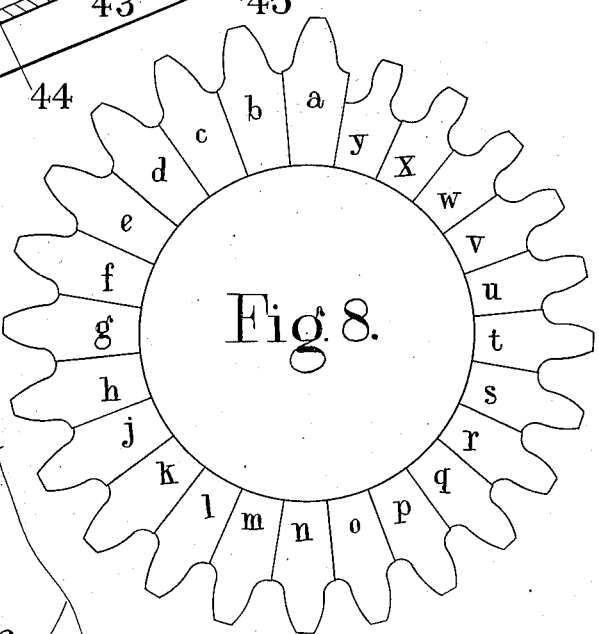
Fig. 5
Fig. 8.
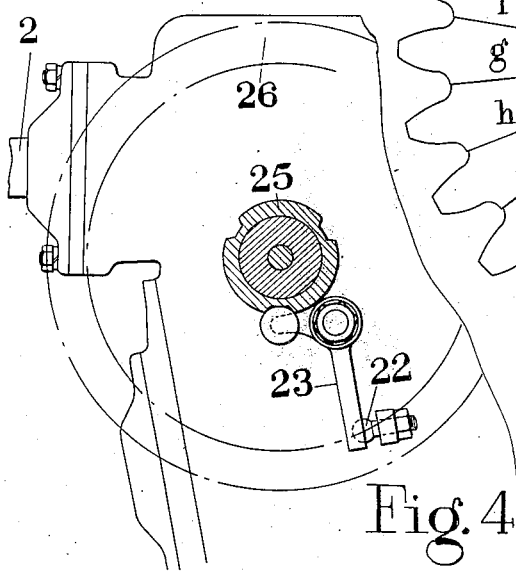
Fig. 4
F. J. Healey
INVENTOR

Aug. 4, 1931.  F. J. HEALEY  1,817,819
VARIABLE VELOCITY RATIO GEARING
Filed April 7, 1930  5 Sheets-Sheet 5

F. J. Healey
INVENTOR

By: Marks & Clerk
ATTYS.

Patented Aug. 4, 1931

1,817,819

UNITED STATES PATENT OFFICE

FRANCIS JEREMIAH HEALEY, OF LONDON, ENGLAND

VARIABLE VELOCITY RATIO GEARING

Application filed April 7, 1930, Serial No. 442,353, and in Great Britain April 11, 1929.

This invention relates to variable velocity ratio gearing of the type in which a plurality of conical toothed wheels of different diameters are arranged adjacent to one another on a common axis and together form a composite member of substantially the form of a toothed cone and a toothed wheel is mounted on a shaft arranged parallel with the generating line of the cone so as to be capable of being moved in an axial direction to engage one or other of the conical toothed wheels in order to secure a driving connection at one or other of a plurality of velocity ratios.

A construction of variable velocity ratio gearing of this kind is described in the United States Patent No. 1,508,879 dated the 16th day of September, 1924.

As will be appreciated, if the teeth on the conical wheels are cut by means of a cutter adapted to form true involute spur wheel teeth the grooves or gashes between which have parallel sides, in the operation of the gear true rolling and line contact between the teeth of a plain spur cut cylindrical pinion and the teeth of the conical wheels cannot be secured and proposals have been made with a view to correcting the form of the teeth in order to approximate such line and rolling contact.
The object of the present invention is to provide a variable velocity ratio gearing of the type above referred to in which the teeth of the conical wheels are so modified or formed as to give an even more satisfactory driving connection between them and the cylindrical spur pinion with which they operate.

According to the present invention the conical wheels are provided with teeth such as are formed on a conical blank by a gear shaper adapted to generate spur wheels when the conical blank is set up so as to rotate about an axis having an inclination with respect to the axis of rotation of a blank to be operated on by the cutter in forming a cylindrical spur wheel which is equal to or approaches one half of the angle at the vertex of a cone of which the conical blank is a frustum, that is to say, the teeth are cut on the cosine of this angle, which gives the slight variability to preserve line and rolling contact between the toothed conical wheel and a spur pinion of corresponding pitch.

In other words, when using a rack or cylindrical toothed cutter in the shaper the inclination of the conical blank with respect to the direction of reciprocation of the cutter is equal to one half of the angle at the vertex of the cone.

In forming the conical wheels any convenient gear shaper adapted to form toothed wheels by generation, by moving the cutter and the blank as two wheels or wheel and rack in mesh may be employed, the cutter being in the form of a rack or circular toothed cutter such as is employed in forming on the said machine spur wheels having involute teeth, a conical blank, however, being used and being set up in the manner above defined.

Thus in forming the conical wheels a Fellows gear shaper may be used.

It will be found that the teeth formed in the manner described will be of involute or substantially involute form at one end, that is to say at or adjacent to the larger end of the cone, the face of the tooth will, however, increase in width from the larger end towards the smaller end of the wheel, while the general curvature of the flanks of the teeth will change from the larger end towards the smaller end.

At the smaller end of the wheel the portions of the flanks of the teeth toward the root thereof will exhibit a less degree of convexity than at the larger end and in fact they may exhibit concavity particularly in the case of wheels of smaller diameters of wheels of a given width of face.

In some instances the change in character of the curvature may be seen to be delimited along a line extending from one end of the wheel to the opposite end which line appears to be substantially parallel with the axis of rotation of the wheel and extends from adjacent to the base of the tooth at the larger end towards the face of the tooth at the smaller end, the curvature of the flank of the tooth above this line being convex and generally corresponding, so far as the eye indicates, with the curvature of an involute tooth.

While in the above description, in defining the form of the teeth, reference has been made to the means by which they are formed, it is to be observed that this mode of description has been resorted to for the sake of convenience and that the invention is not necessarily restricted to a gear in which conical wheels have been formed by such means but extends generally to wheels formed in any other way but having teeth of a generally corresponding form.

Preferably in gearing in accordance with the invention, the cylindrical pinion, with which the conical wheels are designed to operate, is mounted upon its shaft so as to allow a certain degree of angular deflection as is described, for instance, in the specification of United States Patent No. 1,508,879, dated the 16th day of September, 1924.

In short, a gear in accordance with the invention, except in respect of the formation of the teeth on the conical wheels, will resemble a gear constructed as described in the said specification and it may be provided with a clutch arranged within or external to the gear box.

The invention will be described further in respect of the formation of the teeth on the conical wheels may in short be varied within wide limits and may generally conform with existing or prior proposals in connection with such gears.

The invention will be described further in detail and by way of example with reference to the accompanying drawings, in which:—

Figure 4 being a view of a detail of this construction, while

Figure 6:
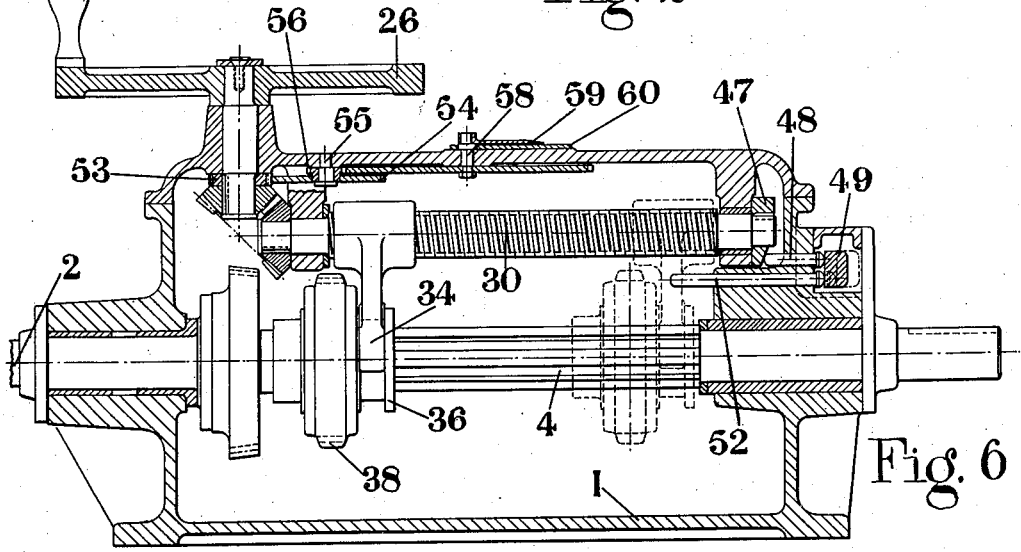

Figure 5 is a sectional plan view of a second construction,

Figure 6 being a sectional elevation, and

Figure 7:
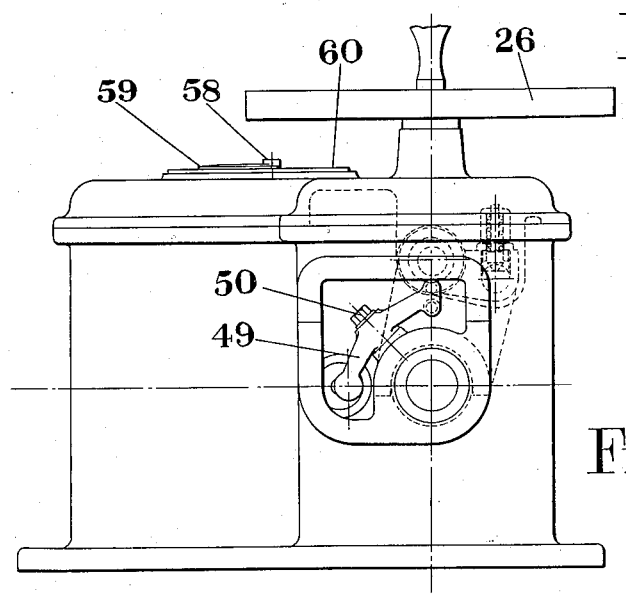
Figure 9:
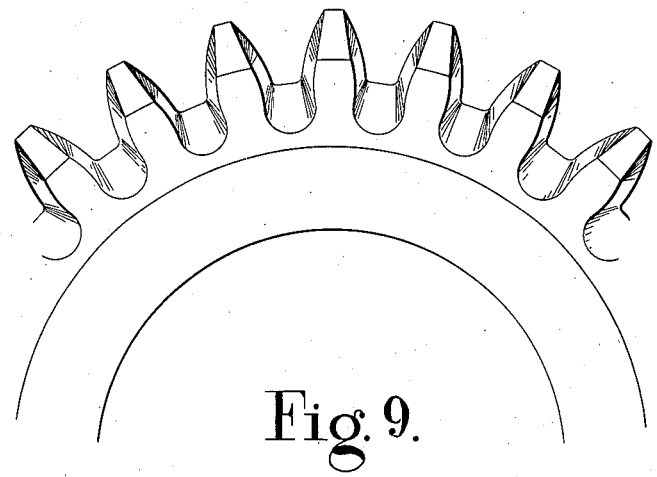
Figure 12:
Figure 10:
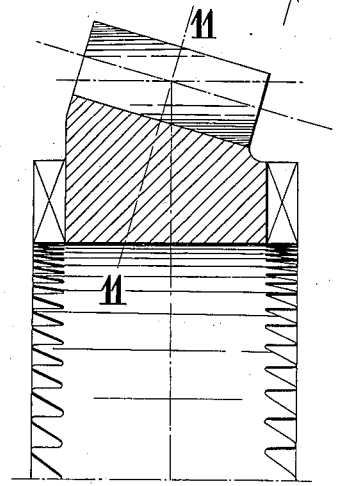
Figure 11:
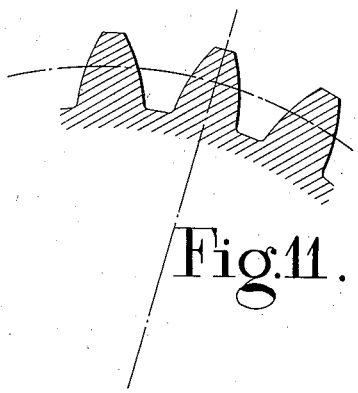

Figure 7 an end elevation of this construction;

Figure 8 is a view on an enlarged scale of one of the conical toothed wheels on the lay shaft of the gear, the teeth having been progressively sectioned in 24 steps to show the variation in contour of the teeth from the larger end of the conical wheel to the smaller end of the same;

Figure 9 is an elevation of a portion of such a wheel,

Figure 10 is a corresponding section in a plane in which the axis of the wheel lies;

Figure 11 is a section on the line XI—XI of Figure 10;

Figure 12 is a plan view showing the face of a tooth, while

Figure 14:
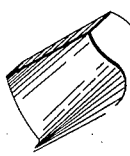
Figure 13:
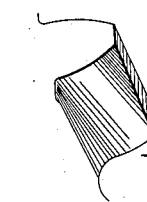

Figures 13 and 14 are projections in the direction of the arrows XIII and XIV respectively, see Figure 12, of a tooth.

Figure 1:
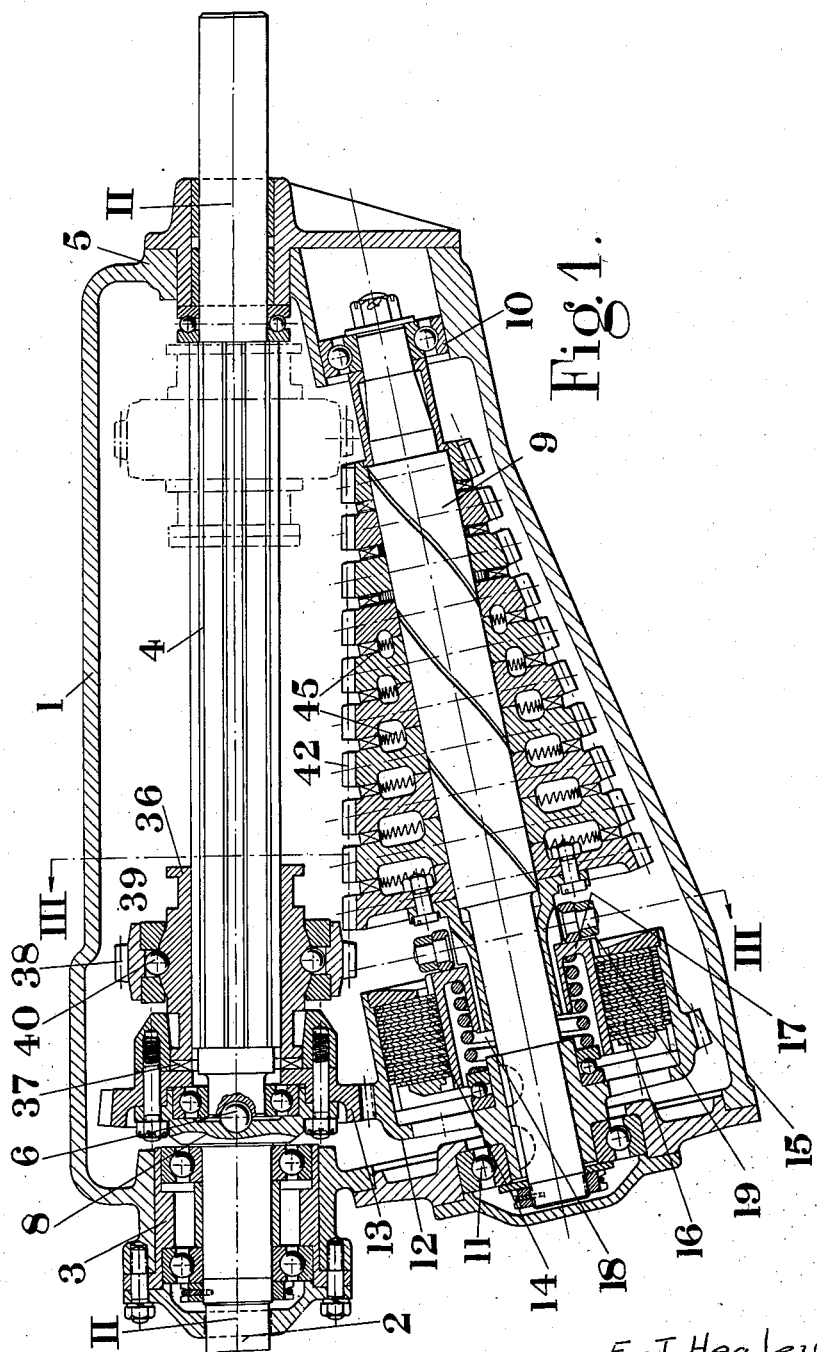
Figure 1 is a sectional plan view of one construction.
Figure 2:
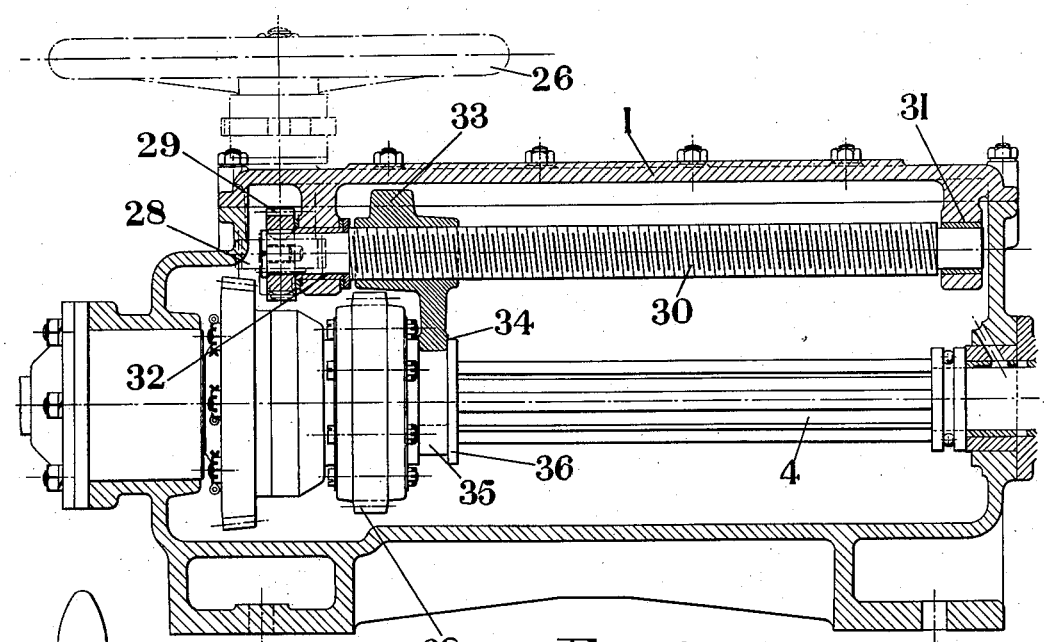
Figure 2 is a corresponding longitudinal section thereof.

Referring to Figures 1 to 7, 1 is the casing of the gear, 2 is the driving shaft, 3 a bearing therefor, 4 is the driven shaft which, as shown in Figures 1 and 2, is splined, a bearing 5 for the driven shaft being provided in one end of the casing while the other end of the driven shaft is mounted in a bearing 6 formed in a socket 7 in the enlarged end 8 of the driving shaft, 9 is a lay shaft journalled in bearings 10 and 11 provided in the casing. To this lay shaft is, in the construction illustrated in Figures 5 to 7, rigidly connected a toothed wheel 12 engaging with the toothed wheel 13 on the enlarged end of the driving shaft.

Figure 3:
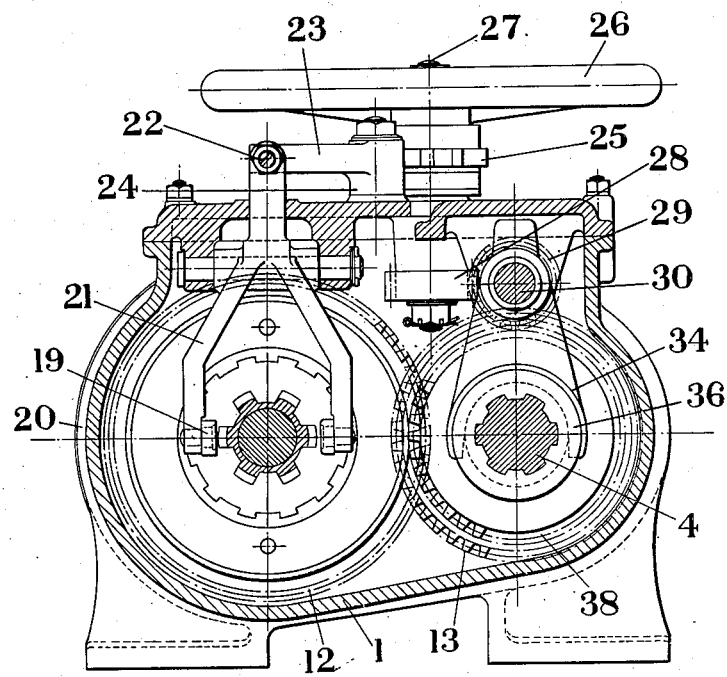
Figure 3 is a section on the line III—III of Figure 1.

In the construction illustrated in Figures 1 to 3, a plate clutch is provided for establishing and interrupting the driving connection between the wheel 12 and the lay shaft. This clutch, as in known constructions, comprises plates 14 secured to the driving element of the clutch which in the construction illustrated is an extension 15 provided on the wheel 12 and other plates 16 secured to the driven element of the clutch which, in the construction illustrated, is a sleeve 17 mounted upon the lay shaft and associated with a spring 18 adapted to force the driving and driven plates into frictional contact. For releasing the driving and driven elements from engagement a forked lever 19 (see Figure 3), provided with rollers 20 engaging against the sleeve 17, is provided. This forked lever is pivoted on the spindle 21 and is adapted to be moved through the intermediary of a ball-ended member 22 by the bell-crank lever 23 pivoted at 24 on the gear case, one end of this bell-crank lever engaging against the surface of a cam member 25, associated with a hand wheel operated in changing the transmission ratio between the driving and driven shafts.

The hand wheel 26 for effecting such changes in the construction illustrated by Figures 1 to 4 and the construction illustrated by Figures 5 to 7 is mounted upon a spindle 27 to which is also secured the wheel 28 meshing with the wheel 29 on the lead screw 30 journalled in bearings 31, 32, so that by its rotation under the influence of the hand wheel the nut 33 on the lead screw may be caused to move axially. This nut is provided with a forked extension 34 engaging in a peripheral recess 35 formed in the sleeve 36 splined to the driven shaft 4. The opposite end of this sleeve is, in the construction illustrated by Figures 1 to 4, provided with dogs 37 so that when the sleeve is in the position shown in Figure 1, the dogs on the sleeve will engage corresponding dogs adjacent to the centre of the wheel 13. On the sleeve 36, in both constructions, is mounted a gear ring 38 through the intermediary of the rings 39 and balls 40, the rings in question engaging about the spherical surfaced portion 41 of the collar, so that a desired degree of freedom of this ring, enabling it to move about an axis at right-angles to the axis of the shaft on which it is mounted, may be secured.

By motion of the gear ring from the position illustrated in Figure 1, under the action of the lead screw and associated parts, the pinion may be caused to engage one or other of the conical toothed wheels 42, the largest of which, in the construction illustrated in Figures 1 to 6, is slidably mounted on the lay shaft, being, in the construction illustrated in Figures 1 to 3, connected with the sleeve of the clutch 17 in such manner that the driving connection between the wheel in question and the lay shaft may be established and interrupted, while in the construction illustrated in Figures 5 to 7 the wheel in question is slidably mounted on the shaft but is in constant driving connecton therewith through the feather 43.

In the construction illustrated in Figures 1 to 3, the spring 18 of the clutch operates to force this larger wheel in an axial direction on the shaft, while in the construction illustrated in Figure 5, a spring 44 is provided for this purpose. All of the toothed conical wheels are provided with serrations 45 whereby when forced axially against one another, they will be caused to rotate together and with the lay shaft. The purpose of these serrated portions, as in existing constructions, is to permit relative motion between adjacent wheels during the operation of changing or varying the velocity ratio between the driving and the driven shafts, which involves moving the toothed ring 38 in an axial direction on the driven shaft so as to disengage the driving connection between it and one of the conical toothed wheels and to establish a driving connection between it and another of the conical toothed wheels.

In the construction illustrated in Figures 5 to 7, for forcing the serrated portions into engagement, as above stated, the spring 44 is provided, the largest of the conical wheels moving axially but remaining in driving connection with the lay shaft in the operation of changing or varying the velocity ratio between the driving and driven shafts.

In the construction illustrated in Figures 1 to 4, the driving connection between the largest of the conical wheels, consequent upon its motion in a direction toward the left of Figure 1 is released or interrupted in moving the gear ring from engagement with one of the conical toothed wheels into engagement with another of these wheels. This release or interruption is secured by the clutch provided, the clutch being actuated simultaneously with the lead screw 30 by the rotation of the hand wheel 26, which causes the elevated portions of the cam 25 to rock the bell-crank lever about its pivot and thereby move the movable element of the clutch in opposition to the spring 18 to interrupt the driving connection between the wheel 12 and the lay shaft. The form of the cam is such that the clutch is released during the interval of time occupied in moving the lead screw sufficient to release the gear ring 38 from its position where it engages one of the conical wheels into position where it engages the next adjacent conical wheel mounted on the lay shaft 9.

In the construction illustrated in Figures 5 to 7, the lead screw is provided with a face cam 47 against which bears a plunger 48 in such manner that when the elevated portion of the cam is against one end of the plunger, the opposite end is forced against the lever 49, which is shown more clearly in Figure 7, mounted upon a pivot 50 thereby moving the lever about its pivot and causing the opposite end of this lever, which bears against the rod 51 slidably mounted within the lay shaft 9 with one of its ends engaging against a portion of the largest of the conical wheels to force this rod in an axial direction in order to move the said wheel in opposition to the spring 44 to an extent sufficient to permit the serrated portion of one of the wheels to move out of engagement with the serrated portion of an adjacent wheel. When the largest of the conical wheels is moved to the extent mentioned, as will be appreciated, any one of the conical wheels will become disengaged from an adjacent wheel but it will be found that only the wheel which is beginning to be engaged by the gear ring will become disengaged from its fellow.

Further, in this construction there is provided a second plunger 52 which is associated with the lever 49. This plunger projects into the casing and is designed to contact with the fork 34 which engages the collar on which the gear ring is mounted so that when the fork has been moved to its extreme right-hand position, referring to Figure 6, the fork will bear against this plunger moving the lever 49 about its pivot and thereby forcing the rod 51 toward the left-hand side of Figure 5 and thereby moving the largest of the conical wheels in opposition to the spring 44 and permitting the remainder of the conical wheels to be released from driving engagement with the lay shaft.

In the construction in question, for indicating the velocity ratio, on the spindle with which the hand wheel is connected there is mounted a pinion 53 engaging a spur wheel 54 mounted upon the pivot 55 on which is also mounted, in rigid engagement with the toothed wheel, the pinion 56 engaging a toothed wheel 57 mounted upon a pivot 58 to which is also secured an index 59 co-operating with a scale 60.

The form of the conical toothed wheels provided in accordance with the invention and which constitutes the characteristic feature thereof is clearly illustrated in Figures 8 to 14.

In Figure 8, $a$ indicates the contour of one of the teeth at the larger end of the conical wheel, $b, c, d, e, f, g, h, j, k, l, m, n, o, p, q, r, s, t, u, v, w, x, y$, indicate the contours of the teeth progressively sectioned in 24 steps down to smaller end of conical wheel.

As will be seen from Figure 9, the faces of the teeth increase in width from the larger end to the smaller end of the wheel while towards the smaller end the teeth tend to become increasingly undercut adjacent to their roots. The pitch line E, F on Figure 10 is substantially parallel with the axis of the wheel and, therefore, is at the larger end of the wheel closer to the root of the tooth than at the smaller end of the wheel.

Having now described my invention what I claim as new and desire to secure by Letters Patent is:—

1. Variable velocity ratio gearing comprising a driving shaft and a driven shaft arranged in line, a pinion on said driving shaft, a hollow lay shaft, a toothed wheel on said hollow lay shaft engaging said pinion, on said lay shaft a plurality of conical toothed wheels of different diameters each having teeth such as are formed on a conical blank by a gear shaper adapted to generate spur wheels by the employment of a rack or cylindrical cutter in which the conical blank is set up in the shaper at an inclination with respect to the direction of reciprocation of the cutter equal to one half of the angle at the vertex of the cone, a one way clutch between each of said conical toothed wheels and its adjacent wheel, a rod extending into the hollow lay shaft, means on said rod engaging the largest of the conical toothed wheels thereon, a spur pinion on said driven shaft adapted to engage any of the said conical toothed wheels, a permanent driving connection between said largest conical toothed wheel, and the hollow lay shaft, a screw threaded spindle provided with means engaging said spur pinion, means for rotating the screw threaded spindle, a cam on the screw threaded spindle, a plunger actuated by said cam, a two armed pivoted lever, one of the arms of said lever engaging the plunger and the other of said arms engaging the rod within the hollow lay shaft adapted on rotation of the screw threaded spindle to be oscillated, and to advance the rod in the hollow lay shaft thereby moving said largest conical toothed wheel axially along said hollow lay shaft, and interrupting the driving connection between said driving and driven shafts.

2. Variable velocity ratio gearing comprising a driving shaft and a driven shaft arranged in line, a pinion on said driving shaft, a hollow lay shaft, a toothed wheel on said hollow lay shaft engaging said pinion, on said lay shaft, a plurality of conical toothed wheels of different diameters each having teeth such as are formed on a conical blank by a gear shaper adapted to generate spur wheels by the employment of a rack or cylindrical cutter in which the conical blank is set up in the shaper at an inclination with respect to the direction of reciprocation of the cutter equal to one half of the angle at the vertex of the cone, ratchet teeth on the adjacent faces of the conical toothed wheels, a spring adapted to constrain the ratchet teeth of the several wheels into driving engagement one with the other, a rod extending into the hollow lay shaft, means on said rod engaging the largest of the conical toothed wheels thereon, a spur pinion on said driven shaft adapted to engage any of the said conical toothed wheels, a permanent driving connection between said largest conical toothed wheel, and the hollow lay shaft, a screw threaded spindle provided with means engaging said spur pinion, a bevel pinion on said spindle, a second spindle and a bevel pinion meshing with said first mentioned bevel pinion, a cam on the screw threaded spindle, a plunger actuated by said cam, a two armed pivoted lever, one of the arms of said lever engaging the plunger and the other of said arms engaging the rod within the hollow lay shaft adapted on the rotation of the screw threaded spindle to be oscillated and to advance the rod in the hollow lay shaft thereby moving said largest conical toothed wheel axially along said hollow lay shaft, and interrupting the driving connection between said driving and driven shafts.

3. Variable velocity ratio gearing comprising a driving shaft and a driven shaft arranged in line, a pinion on said driving shaft, a hollow lay shaft, a toothed wheel on said hollow lay shaft engaging said pinion, on said lay shaft a plurality of conical toothed wheels of different diameters each having teeth such as are formed on a conical blank by a gear shaper adapted to generate spur wheels by the employment of a rack or cylindrical cutter in which the conical blank is set up in the shaper at an inclination with respect to the direction of reciprocation of the cutter equal to one half of the angle at the vertex of the cone, a one way clutch between each of said conical toothed wheels and its adjacent wheel, a rod extending into the hollow lay shaft, means on said rod engaging the largest of the conical toothed wheels thereon, a spur pinion on said driven shaft adapted to engage any of the said conical toothed wheels, a permanent driving connection between the largest conical toothed wheel and the hollow lay shaft, a screw threaded spindle provided with means engaging said spur pinion, a bevel pinion on said spindle, a second spindle and a bevel pinion meshing with said first mentioned bevel pinion, a cam on the screw threaded spindle, a plunger actuated by said cam, a two armed pivoted lever, one of the arms of said lever engaging the plunger and the other of said arms engaging the rod within the hollow lay shaft adapted on the rotation of the screw threaded spindle to be oscillated and to advance the rod in the hollow lay shaft thereby moving said largest conical toothed wheel axially along said hollow lay shaft and interrupting the driving connection between said driving and driven shafts, a second plunger adjacent said first mentioned plunger adapted also to actuate said two armed pivoted lever and thereby move said largest spur toothed conical wheel axially along the lay shaft, and interrupt the driving connection between said driving and driven shafts to provide a neutral position when the spur pinion on the driven shaft is moved to the extremity of the lay shaft remote from said largest spur toothed conical wheel.

4. Variable velocity ratio gearing comprising a driving shaft and a driven shaft arranged in line, a pinion on said driving shaft, a hollow lay shaft, a toothed wheel on said hollow lay shaft engaging said pinion, on said lay shaft a plurality of conical toothed wheels of different diameters each having teeth such as are formed on a conical blank by a gear shaper adapted to generate spur wheels by the employment of a rack or cylindrical cutter in which the conical blank is set up in the shaper at an inclination with respect to the direction of reciprocation of the cutter equal to one half of the angle at the vertex of the cone, ratchet teeth on the adjacent faces of the conical toothed wheels, a spring adapted to constrain the ratchet teeth of the several wheels into driving engagement one with the other, a rod extending into the hollow lay shaft, means on said rod engaging the largest of the conical toothed wheels thereon, a spur pinion on said driven shaft adapted to engage any of the said conical toothed wheels, a permanent driving connection between said largest conical toothed wheel, and the hollow lay shaft, a screw threaded spindle provided with means engaging said spur pinion, a bevel pinion on said spindle, a second spindle and a bevel pinion meshing with said first mentioned bevel pinion, a cam on the screw threaded spindle, a plunger actuated by said cam, a two armed pivoted lever, one of the arms of said lever engaging the plunger and the other of said arms engaging the rod within the hollow lay shaft adapted on the rotation of said screw threaded spindle to advance the rod in the hollow lay shaft thereby moving said largest conical toothed wheel axially along said hollow lay shaft and interrupting the driving connection between said driving and driven shafts, a second plunger adjacent said first-mentioned plunger adapted also to actuate said two armed pivoted lever and thereby move said largest spur toothed conical wheel axially along the lay shaft, and interrupt the driving connection between said driving and driven shafts to provide a neutral position when the spur pinion on the driven shaft is moved to the extremity of the lay shaft remote from said largest spur toothed conical wheel.

5. Variable velocity ratio gearing comprising a driving shaft and a driven shaft arranged in line, a pinion on said driving shaft, a hollow lay shaft, a toothed wheel on said hollow lay shaft engaging said pinion, on said lay shaft a plurality of conical toothed wheels of different diameters, a one way clutch between each of said conical toothed wheels and its adjacent wheel, a rod extending into the hollow lay shaft, means on said rod engaging the largest of the conical toothed wheels thereon, a spur pinion on said driven shaft adapted to engage any of the said conical toothed wheels, a permanent driving connection between said largest conical toothed wheel and the hollow lay shaft, a screw threaded spindle provided with means engaging said spur pinion, means for rotating the screw threaded spindle, a cam on the screw threaded spindle, a plunger actuated by said cam, a two armed pivoted lever one of the arms of said lever engaging the plunger and the other of said arms engaging the rod within the hollow lay shaft adapted on rotation of the screw threaded spindle to be oscillated and to advance the rod in the hollow lay shaft thereby moving said largest conical toothed wheel axially along said hollow lay shaft and interrupting the driving connection between said driving and driven shafts.

6. Variable velocity ratio gearing comprising a driving shaft and a driven shaft arranged in line, a pinion on said driving shaft, a hollow lay shaft, a toothed wheel on said hollow lay shaft engaging said pinion, on said hollow lay shaft a plurality of conical toothed wheels of different diameters, ratchet teeth on the adjacent faces of the conical toothed wheels, a spring adapted to constrain the ratchet teeth of the several wheels into driving engagement one with the other, a rod extending into the hollow lay shaft, means on said rod engaging the largest of the conical toothed wheels thereon, a spur pinion on said driven shaft adapted to engage any of the said conical toothed wheels, a permanent driving connection between said largest conical toothed wheel and the hollow lay shaft, a screw threaded spindle provided with means engaging said spur pinion, a bevel pinion on said spindle, a second spindle and a bevel pinion meshing with said first-mentioned bevel pinion, a cam on the screw threaded spindle, a plunger actuated by said cam, a two armed pivoted lever one of the arms of said lever engaging the plunger and the other of said arms engaging the rod within the hollow lay shaft adapted on the rotation of the screw threaded spindle to be oscillated and to advance the rod in the hollow lay shaft thereby moving said largest conical toothed wheel axially along said hollow lay shaft and interrupting the driving connection between said driving and driven shafts.

7. Variable velocity ratio gearing comprising a driving shaft and a driven shaft arranged in line, a pinion on said driving shaft, a hollow lay shaft, a toothed wheel on said hollow lay shaft engaging said pinion, on said lay shaft a plurality of conical toothed wheels of different diameters, a one way clutch between each of said conical toothed wheels and its adjacent wheel, a rod extending into the hollow lay shaft, means on said rod engaging the largest of the conical toothed wheels thereon, a spur pinion on said driven shaft adapted to engage any of the said conical toothed wheels, a permanent driving connection between the largest conical toothed wheel and the hollow lay shaft, a screw threaded spindle provided with means engaging said spur pinion, a bevel pinion on said spindle, a second spindle and a bevel pinion meshing with said first mentioned bevel pinion, a cam on the screw threaded spindle, a plunger actuated by said cam, a two armed pivoted lever one of the arms of said lever engaging the plunger and the other of said arms engaging the rod within the hollow lay shaft adapted on the rotation of the screw threaded spindle to be oscillated and to advance the rod in the hollow lay shaft thereby moving said largest conical toothed wheel axially along said hollow lay shaft and interrupting the driving connection between said driving and driven shafts, a second plunger adjacent said first mentioned plunger adapted also to actuate said two armed pivoted lever and thereby move said largest spur toothed conical wheel axially along the lay shaft and interrupt the driving connection between said driving and driven shafts to provide a neutral position when the spur pinion on the driven shaft is moved to the extremity of the lay shaft remote from said largest spur toothed conical wheel.

8. Variable velocity ratio gearing comprising a driving shaft and a driven shaft arranged in line, a pinion on said driving shaft, a hollow lay shaft, a toothed wheel on said hollow lay shaft engaging said pinion, on said lay shaft a plurality of conical toothed wheels of different diameters, ratchet teeth on the adjacent faces of the conical toothed wheels, a spring adapted to constrain the ratchet teeth of the several wheels into driving engagement one with the other, a rod extending into the hollow lay shaft, means on said rod engaging the largest of the conical toothed wheels thereon, a spur pinion on said driven shaft adapted to engage any of the said conical toothed wheels, a permanent driving connection between said largest conical toothed wheels and the hollow lay shaft, a screw threaded spindle provided with means engaging said spur pinion, a bevel pinion on said spindle, a second spindle and a bevel pinion meshing with said first mentioned bevel pinion, a cam on the screw threaded spindle a plunger actuated by said cam, a two armed pivoted lever, one of the arms of said lever engaging the plunger and the other of said arms engaging the rod within the hollow lay shaft adapted on the rotation of said screw threaded spindle to advance the rod in the hollow lay shaft thereby moving said largest conical toothed wheel axially along said hollow lay shaft and interrupting the driving connection between said driving and driven shafts, a second plunger adjacent said first mentioned plunger adapted also to actuate said two armed pivoted lever and thereby move said largest spur toothed conical wheel axially along the lay shaft and interrupt the driving connection between said driving and driven shafts to provide a neutral position when the spur pinion on the driven shaft is moved to the extremity of the lay shaft remote from said largest spur toothed conical wheel.

In testimony whereof I have signed my name to this specification.

FRANCIS JEREMIAH HEALEY.